(12) United States Patent
Ogawa et al.

(10) Patent No.: US 9,155,073 B2
(45) Date of Patent: Oct. 6, 2015

(54) TRANSMITTER APPARATUS, RECEIVER APPARATUS, TRANSMISSION METHOD, AND RECEPTION METHOD

(75) Inventors: Yoshihiko Ogawa, Kanagawa (JP); Akihiko Nishio, Kanagawa (JP); Daichi Imamura, Kanagawa (JP)

(73) Assignee: PANASONIC INTELLECTUAL PROPERTY CORPORATION OF AMERICA, Torrance, CA (US)

( * ) Notice: Subject to any disclaimer, the term of this patent is extended or adjusted under 35 U.S.C. 154(b) by 441 days.

(21) Appl. No.: 13/823,925

(22) PCT Filed: Sep. 20, 2011

(86) PCT No.: PCT/JP2011/005282
§ 371 (c)(1),
(2), (4) Date: Mar. 15, 2013

(87) PCT Pub. No.: WO2012/046399
PCT Pub. Date: Apr. 12, 2012

(65) Prior Publication Data
US 2013/0170467 A1    Jul. 4, 2013

(30) Foreign Application Priority Data

Oct. 4, 2010    (JP) ................. 2010-224721

(51) Int. Cl.
| | |
|---|---|
| H04W 72/04 | (2009.01) |
| H04B 1/713 | (2011.01) |
| H04L 5/00 | (2006.01) |
| H04W 72/00 | (2009.01) |
| H04W 72/12 | (2009.01) |

(52) U.S. Cl.
CPC .............. H04W 72/04 (2013.01); H04B 1/713 (2013.01); H04L 5/0012 (2013.01); H04L 5/0041 (2013.01); H04L 5/0048 (2013.01); H04L 5/0078 (2013.01); H04L 5/0023 (2013.01); H04L 5/0055 (2013.01); H04W 72/00 (2013.01); H04W 72/12 (2013.01)

(58) Field of Classification Search
None
See application file for complete search history.

(56) References Cited

U.S. PATENT DOCUMENTS

2013/0182674 A1 * 7/2013 Lunttila et al. ................ 370/329

FOREIGN PATENT DOCUMENTS

JP    2010-178129 A    8/2010

OTHER PUBLICATIONS

Research in Motion, UK Ltd., Performance Enhancement of Aperiodic SRS with Configurable Duration, 3GPP TSG RAN WG1 Meeting #61bis, R1-104061, Dresden, Germany, Jun. 28-Jul. 2, 2010.

(Continued)

*Primary Examiner* — Huy D Vu
*Assistant Examiner* — Teisha D Hall
(74) *Attorney, Agent, or Firm* — Pearne & Gordon LLP

(57) ABSTRACT

In a terminal (200), a transmission control unit (206) identifies candidate resources on the basis of setting information and determines, on the basis of a trigger signal, a mapping resource, in which a second type of reference signal is mapped, in candidate frequency unit groups constituting the candidate resources. Each of the candidate resources is constituted by a plurality of fundamental subframe groups that are arranged at first intervals. N constituent subframes constituting each of the fundamental subframe groups are arranged at second intervals narrower than the first intervals. Each of the candidate frequency units of each candidate frequency unit group is a frequency unit specified by a predetermined frequency hopping pattern in M frequency units in each constituent subframe.

10 Claims, 13 Drawing Sheets

(56) References Cited

OTHER PUBLICATIONS

TS36.211 v8.9.0 "3GPP TSG RAN; Evolved Universal Terrestrial Radio Access (E-UTRA); Physical Channels and Modulation" (Dec. 2009).

Catt, On aperiodic SRS Transmission in LTE-A, 3GPP TSG WG1 Meeting #61bis R1-103486. 3GPP TSG RAN WG1 Meeting #61bis R1-103486, 3GPP, Jul. 2, 2010.

Mitsubishi Electric, UL Sounding RS Control Signaling for Closed Loop Antenna Selection, 3GPP RAN1 #51bis R1-080017, 3GPP, Jan. 18, 2008.

Research in Motion, UK Ltd., Additional Simulation Results on Aperiodic SRS with Configurable Duration, 3GPP TSG RAN WG1 Meeting #62 R1-104920, 3GPP, Aug. 27, 2010.

International Search Report for PCT/JP2011/005282 dated Oct. 18, 2011.

* cited by examiner

TRANSMITTER APPARATUS, RECEIVER APPARATUS, TRANSMISSION METHOD, AND RECEPTION METHOD

TECHNICAL FIELD

The present invention relates to a transmitter apparatus, a receiver apparatus, a transmission method, and a reception method of a reference signal.

BACKGROUND ART

In an uplink line of 3GPP LTE (3rd Generation Partnership Project Long-term Evolution; hereinafter, simply referred to as "LTE"), a periodic sounding reference signal (P-SRS) is used as a reference signal for measuring uplink reception quality (refer to NPL 1).

In order to transmit the P-SRS from a terminal to a base station, SRS resources (hereinafter, referred to as "common resources") which are common to all terminals are set. A notification of these common resources is performed with the cell units. For example, if a notification indicating that the common resources are first, third and eighth subframes is performed using control information, all terminals in a cell stop transmission of data signals during a predetermined time period (specifically, a final symbol) of each of the first, third and eighth subframes, and use the time period as a transmission resource of a reference signal.

In addition, information regarding a resource which is practically allocated to each terminal in the common resources is notified by a higher-order layer than a physical layer with the terminal units. Thereby, the common resources are distributed to the respective terminals.

Specifically, a resource for transmitting a reference signal can be periodically allocated to the respective terminals in the time axis direction.

In addition, methods of transmitting the reference signal include wide band transmission and narrow band transmission. In the wide band transmission, the reference signal is transmitted using the overall bands set for a terminal, whereas, in the narrow band transmission, the reference signal is transmitted using a first partial band of a plurality of partial bands forming set bands at the first timing, and the reference signal is transmitted using a second partial band different from the first partial band at the second timing. In other words, in the narrow band transmission, frequency hopping is employed (refer to FIG. 1). Therefore, the reference signal is transmitted using only the narrow band at one timing, but the frequency hopping is repeatedly performed, and thereby the reference signal is transmitted using all the set bands. Thereby, a base station can measure reception quality in all the set bands.

In addition, the reference signal is scrambled using orthogonal sequences in each terminal and is transmitted. In other words, the reference signals which are transmitted from a plurality of terminals are multiplexed through time division, frequency division, and code division, and are transmitted.

In addition, information (that is, a parameter used to specify a resource) regarding a resource which is practically allocated to each terminal in the above-described common resources includes a leading subframe, a set band, a transmission bandwidth, a frame interval at which a reference signal is mapped, a transmission time, and the like. Each terminal is notified of this information by a higher-order layer than a physical layer.

Here, as described above, the higher-order layer than the physical layer notifies of the information regarding the resource which is practically allocated to each terminal in the common resource. Since a terminal which has received the notification and a base station which is a transmission source transmit and receive ACK/NACK and the like therebetween in the higher-order layer, there is a problem in that time until the terminal practically starts transmitting, a reference signal after receiving the notification, is lengthened.

In an uplink line of LTE-Advanced (hereinafter, referred to as "LTE-A") which has further progressed from the LTE, an introduction of a DA-SRS (Dynamic Aperiodic SRS) has been examined. Transmission timing of the DA-SRS is controlled by trigger information (for example, information of 1 bit) which is transmitted from a base station to a terminal. The trigger information is transmitted using a control channel (that is, PDCCH) of a physical layer. In addition, when the trigger information is received, the terminal starts transmitting the DA-SRS from each transmission antenna thereof. In addition, as methods of transmitting the DA-SRS, single shot in which one DA-SRS is transmitted with respect to a single piece of trigger information and multi-shot in which a plurality of DA-SRS are transmitted with respect to a single piece of trigger information are examined. In a case of the multi-shot, a plurality of DA-SRS are transmitted using different subframes. Further, parameters are independently set for the DA-SRS and the P-SRS.

Here, as described above, the P-SRS is periodically transmitted, whereas the DA-SRS is transmitted based on a notification which is performed from a base station to a terminal in a physical layer when transmission data is generated in bursts. Therefore, for example, the DA-SRS is used to measure reception quality for allocating a resource to a data signal which is generated in bursts and has a relatively small amount of data, whereas the P-SRS is used to measure reception quality for allocating a resource to a data signal which is frequently generated.

CITATION LIST

Non-Patent Literature

NPL 1
TS36.211 v8.9.0 "3GPP TSG RAN; Evolved Universal Terrestrial Radio Access (E-UTRA); Physical Channels and Modulation"

SUMMARY OF INVENTION

Technical Problem

However, in a case where the transmission method of a first type reference signal (P-SRS) in which a higher-order layer than a physical layer notifies of information regarding a resource is merely applied to a transmission method of a second type reference signal (DA-SRS) in which the physical layer notifies of information regarding a resource, a "candidate resource" to which the second type reference signal can be mapped is set as follows.

In other words, first, a candidate subframe to which a terminal, which is a setting target, can map the second type reference signal is set. The candidate subframe, which is a candidate resource, is specified using a leading subframe and a transmission interval which are parameters used to specify a resource and are transmitted from a base station to a terminal. The terminal specifies, for example, a subframe group with a constant interval from the leading subframe as a "candidate subframe group" which can be used to transmit the second type reference signal by the terminal itself.

In addition, a candidate partial band (that is, candidate frequency resource) to which a reference signal can be mapped out of a plurality of partial bands in each subframe of the candidate subframe group is specified by a frequency hopping pattern.

In this way, a candidate resource is set for the setting target terminal.

In addition, the terminal starts transmitting the second type reference signal from a subframe included in the set candidate resource, the subframe being a subframe four or more subframes after a subframe at which trigger information is received from the base station. Further, the second type reference signal is transmitted in a single candidate frequency resource unit in a case of the single shot, whereas the second type reference signal is transmitted in each candidate frequency resource unit of a plurality of subframes included in the candidate resource in a case of the multi-shot. In addition, the base station allocates the same subframe to a plurality of terminals. Thereby, it is possible to reduce much of the occurrence of vacant resources where a reference signal is not allocated. However, by using the trigger information to each terminal, the base station controls timing when each terminal transmits the reference signal such that a conflict between a plurality of reference signals transmitted from a plurality of terminals does not occur.

However, as shown in FIG. 2, if a subframe interval of the candidate subframe group of a certain setting target terminal is set to be short, the number of subframes decreases which can be used by a terminal which is other than the setting target terminal and uses subframes different from those of the setting target terminal. In addition, for example, in a case where a candidate subframe group of the first type reference signal is different from a candidate subframe group of the second type reference signal, the larger the number of the candidate subframes of the second type reference signal, the smaller the number of the candidate subframes of the first type reference signal. As a result, since a chance of transmitting the first type reference signal which is periodically transmitted is reduced, it is difficult for the base station to perform frequency scheduling.

In addition, as shown in FIG. 3, if a subframe interval of a candidate subframe group of a certain setting target terminal is set to be long, the setting target terminal cannot repeatedly transmit the second type reference signal during a short time period. Therefore, it takes a long time to complete one cycle of a frequency hopping pattern, and thus time taken to transmit the second type reference signal using all bands set for the setting target terminal is lengthened. As a result, in a case where the base station performs frequency scheduling in all the bands on the setting target terminal, time taken to acquire reception quality measurement results of all the bands required for the frequency scheduling is lengthened, and thus timing for performing the frequency scheduling is delayed.

An object of the present invention is to provide a transmitter apparatus, a receiver apparatus, a transmission method, and a reception method of a reference signal, capable of efficiently performing frequency scheduling while suppressing an amount of candidate resource to which the reference signal is mapped.

Solution to Problem

According to an aspect of the present invention, there is provided a transmitter apparatus including a reception section that receives setting information regarding a candidate resource to which a reference signal is mapped, in a physical layer; a specifying section that specifies the candidate resource on the basis of the setting information; a determination section that determines a mapping resource to which a reference signal is mapped on the basis of a trigger signal in a candidate frequency unit group forming the candidate resource; and a transmission section that maps a reference signal to the determined mapping resource and transmits the mapped reference signal, in which the candidate resource includes a plurality of basic subframe groups disposed at a first interval, and N (where N is a natural number which is equal to or more than 2) constituent subframes forming each basic subframe group are disposed at a second interval shorter than the first interval, and each candidate frequency unit of the candidate frequency unit group is a frequency unit which is regulated by a predetermined frequency hopping pattern among M (where M is a natural number which is equal to or more than 2) frequency units of each constituent subframe.

According to an aspect of the present invention, there is provided a receiver apparatus including a setting section that sets a candidate resource to which a reference signal is mapped, for a transmission side of the reference signal; a notification section that notifies of setting information regarding the candidate resource in a physical layer; and a reception section that receives the reference signal in the candidate resource, in which the candidate resource includes a plurality of basic subframe groups disposed at a first interval, and N (where N is a natural number which is equal to or more than 2) constituent subframes forming each basic subframe group are disposed at a second interval shorter than the first interval, and each candidate frequency unit of a candidate frequency unit group that forms the candidate resource is a frequency unit which is regulated by a predetermined frequency hopping pattern among M (where M is a natural number which is equal to or more than 2) frequency units of each constituent subframe.

According to an aspect of the present invention, there is provided a transmission method including receiving setting information regarding a candidate resource to which a reference signal is mapped, in a physical layer; specifying the candidate resource on the basis of the setting information; determining a mapping resource to which a reference signal is mapped on the basis of a trigger signal in a candidate frequency unit group forming the candidate resource; and mapping a reference signal to the determined mapping resource and transmitting the mapped reference signal, in which the candidate resource includes a plurality of basic subframe groups disposed at a first interval, and N (where N is a natural number which is equal to or more than 2) constituent subframes forming each basic subframe group are disposed at a second interval shorter than the first interval, and each candidate frequency unit of the candidate frequency unit group is a frequency unit which is regulated by a predetermined frequency hopping pattern among M (where M is a natural number which is equal to or more than 2) frequency units of each constituent subframe.

According to an aspect of the present invention, there is provided a reception method including setting a candidate resource to which a reference signal is mapped, for a transmission side of the reference signal; notifying of setting information regarding the candidate resource in a physical layer; and receiving the reference signal in the candidate resource, in which the candidate resource includes a plurality of basic subframe groups disposed at a first interval, and N (where N is a natural number which is equal to or more than 2) constituent subframes forming each basic subframe group are disposed at a second interval shorter than the first interval, and each candidate frequency unit of a candidate frequency unit group that forms the candidate resource is a frequency unit which is regulated by a predetermined frequency hopping pattern among M (where M is a natural number which is equal to or more than 2) frequency units of each constituent subframe.

Advantageous Effects of Invention

According to the present invention, it is possible to provide a transmitter apparatus, a receiver apparatus, a transmission method, and a reception method of a reference signal, capable of efficiently performing frequency scheduling while suppressing an amount of candidate resource to which the reference signal is mapped.

DESCRIPTION OF EMBODIMENTS

Figure 1:
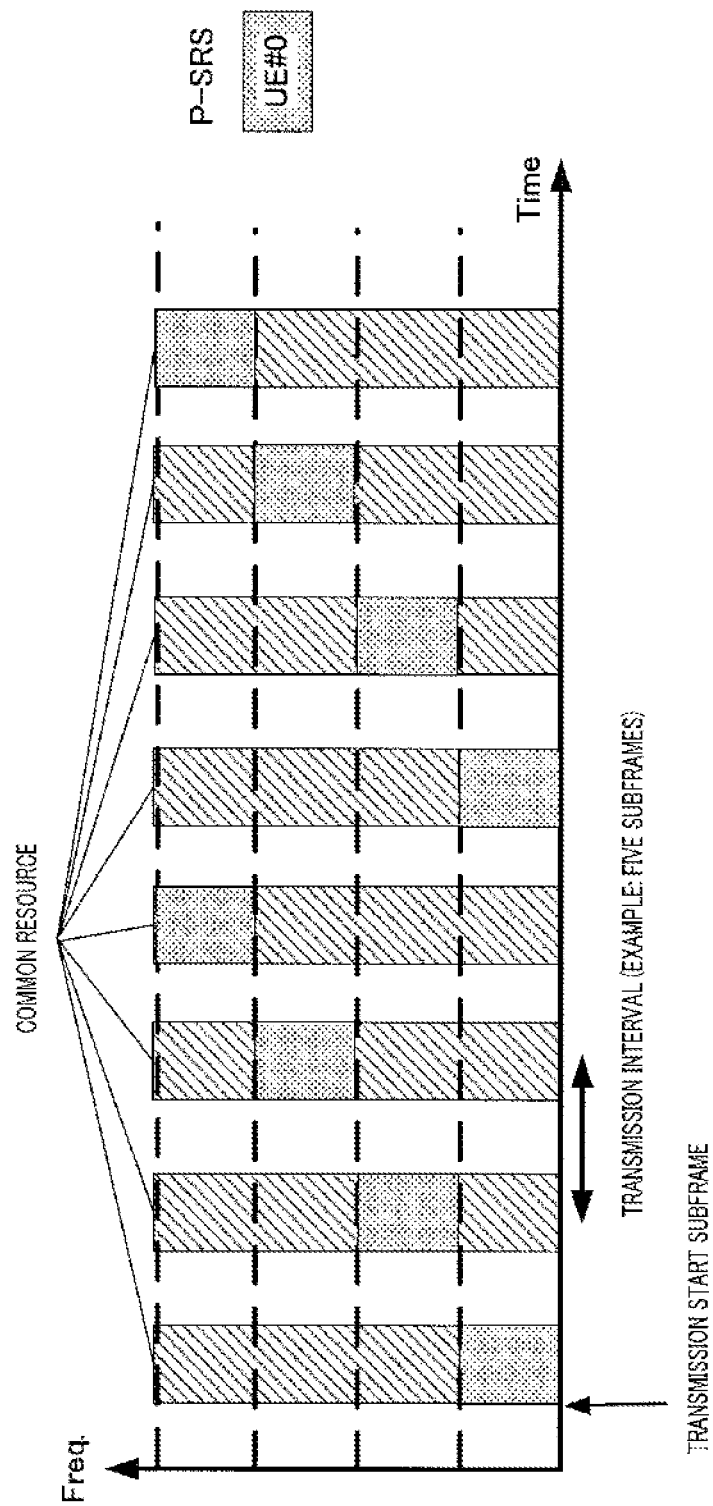
FIG. 1 is a diagram illustrating a narrow band transmission method of a reference signal.
Figure 2:
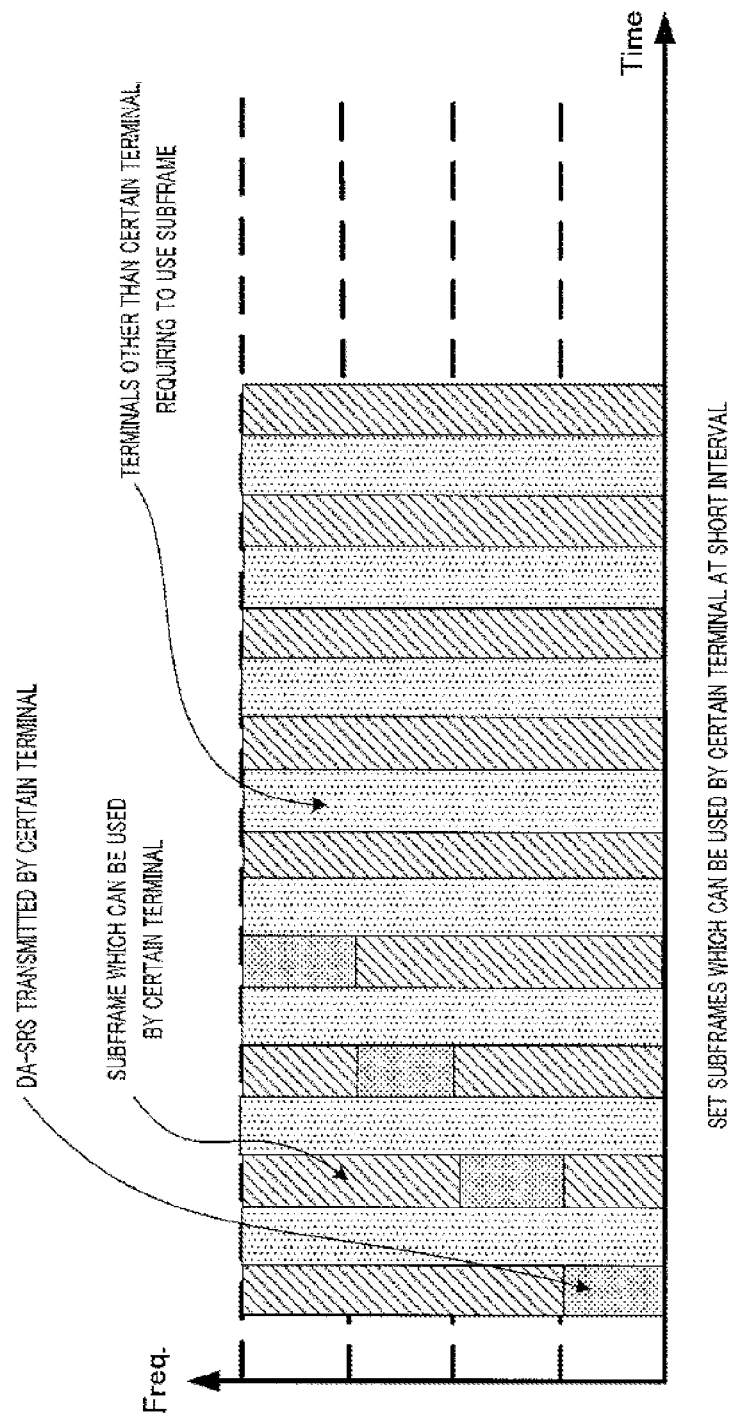
FIG. 2 is a diagram illustrating a candidate resource when a subframe interval of a candidate subframe group is set to be short.
Figure 3:
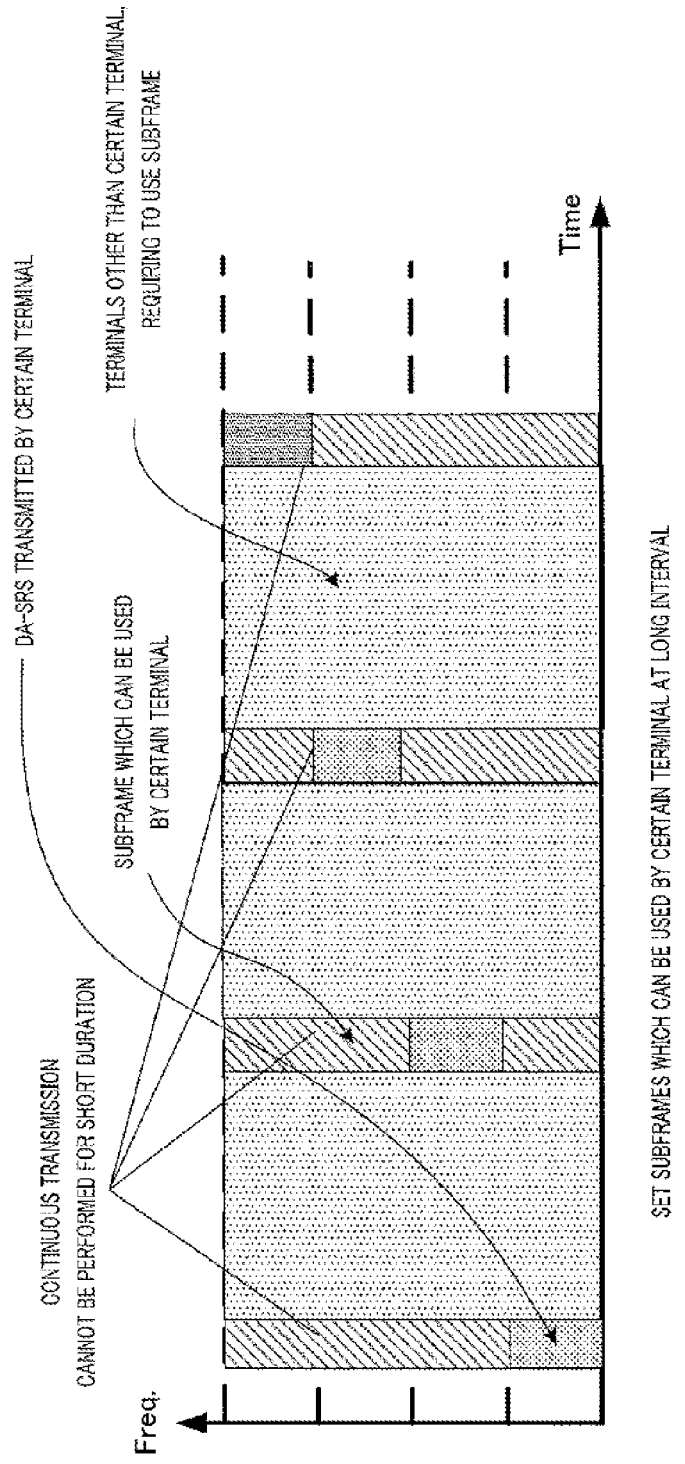
FIG. 3 is a diagram illustrating a candidate resource when a subframe interval of a candidate subframe group is set to be long.

Hereinafter, embodiments of the present invention will be described in detail with reference to the drawings. In addition, in the embodiments, the same constituent elements are given the same reference numerals, and repeated description thereof will be omitted.

Embodiment 1

Outline of Communication System

A communication system according to Embodiment 1 of the present invention includes base station 100 and terminal 200. Base station 100 is an LTE-A base station, and terminal 200 is an LTE-A terminal.

Figure 4:
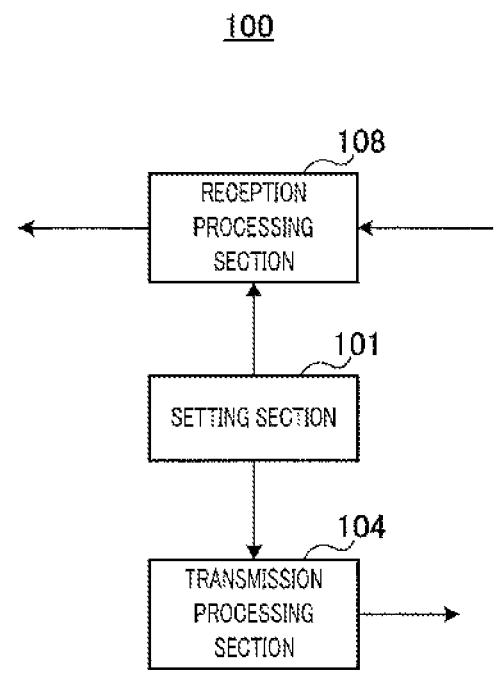
FIG. 4 is a main configuration diagram of a base station according to Embodiment 1 of the present invention.

FIG. 4 is a main configuration diagram of base station 100 according to Embodiment 1 of the present invention. In base station 100, setting section 101 sets a "candidate resource" to which the second type reference signal is mapped for terminal 200 which is a transmission side of the second type reference signal, transmission processing section 104, which is notification means, notifies of setting information regarding the candidate resource in a physical layer, and reception processing section 108 receives the second type reference signal in the candidate resource.

In addition, the "candidate resource" includes a plurality of basic subframe groups which are disposed at the first interval, N (where N is a natural number which is equal to or more than 2) constituent subframes forming each basic subframe group are disposed at the second interval which is shorter than the first interval, and each candidate frequency unit of a candidate frequency unit group is a frequency unit regulated by a predetermined frequency hopping pattern among M (where M is a natural number which is equal to or more than 2) frequency units of each constituent subframe.

Figure 5:
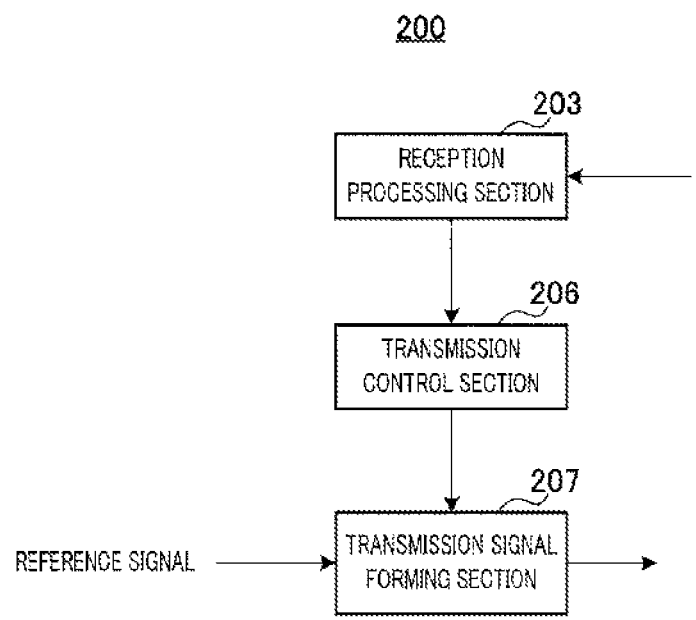
FIG. 5 is a main configuration diagram of a terminal according to Embodiment 1 of the present invention.

FIG. 5 is a main configuration diagram of terminal 200 according to Embodiment 1 of the present invention. In terminal 200, reception processing section 203 receives setting information regarding a candidate resource to which the second type reference signal is mapped in the physical layer, transmission control section 206 specifies a candidate resource on the basis of the setting information, and determines a mapping resource to which the second type reference signal is mapped based on a trigger signal in a candidate frequency unit group forming the candidate resource, and transmission signal forming means maps the second type reference signal to the determined mapping resource and transmits the mapped signal.

In addition, the "candidate resource" includes a plurality of basic subframe groups disposed at the first interval, N (where N is a natural number which is equal to or more than 2) constituent subframes forming each basic subframe group are disposed at the second interval which is shorter than the first interval, and each candidate frequency unit of a candidate frequency unit group is a frequency unit regulated by predetermined frequency hopping pattern among M (where M is a natural number which is equal to or more than 2) frequency units of each constituent subframe.

Hereinafter, a description will be made based on an FDD system in which an uplink line and a downlink line are frequency-divided.

Configuration of Base Station 100

Figure 6:
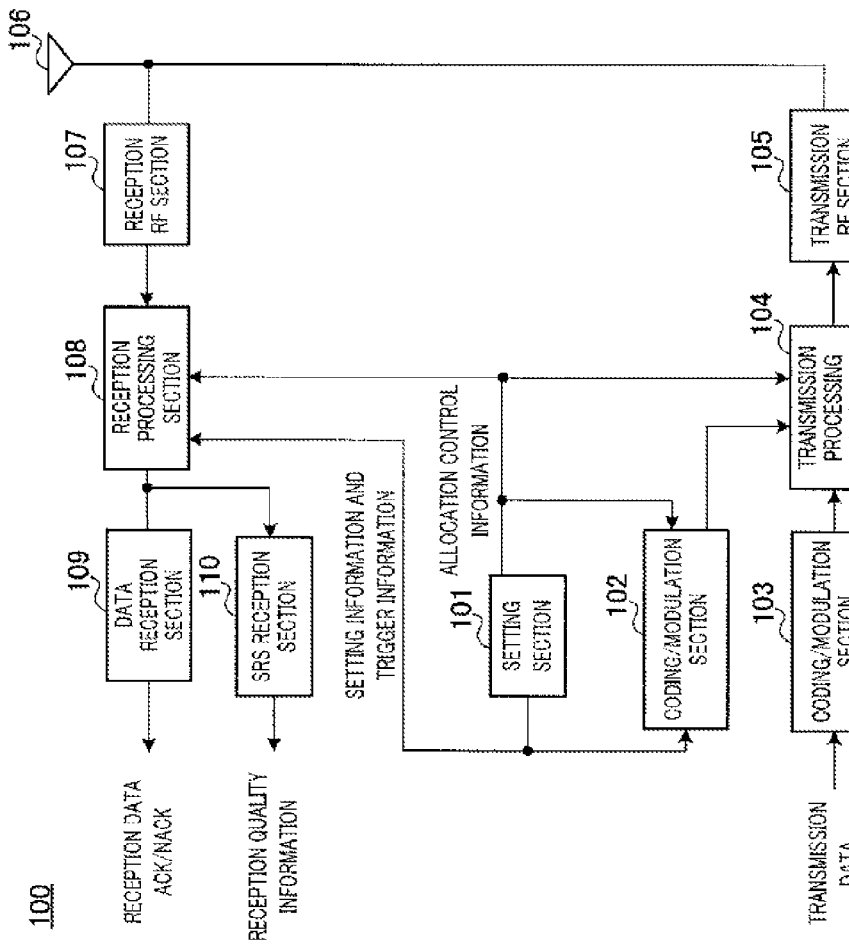
FIG. 6 is a block diagram illustrating a configuration of the base station according to Embodiment 1 of the present invention.

FIG. 6 is a block diagram illustrating a configuration of base station 100 according to Embodiment 1 of the present invention. In FIG. 6, base station 100 includes setting section 101, coding/modulation sections 102 and 103, transmission processing section 104, transmission RF section 105, antenna 106, reception RF section 107, reception processing section 108, data reception section 109, and SRS reception section 110.

Setting section 101 generates "candidate resource setting information" for setting a "candidate resource" of setting target terminal 200. This candidate resource is a resource to which setting target terminal 200 can map the second type reference signal (for example, a DA-SRS) as described above. In addition, the candidate resource setting information includes a leading subframe and a leading frequency band where setting target terminal 200 starts setting of a candidate resource, a frequency bandwidth which can be used by setting target terminal 200, a frequency bandwidth (that is a frequency hopping bandwidth) used at each timing of frequency hopping, and "candidate subframe group setting information". The "candidate subframe group setting information" includes the number of subframes forming a "basic subframe group", an interval (hereinafter, also referred to as an "interval between constituent subframes") between constituent subframes in the basic subframe group, and an interval (hereinafter, also referred to as an "interval between basic subframe groups") between subframes (for example, leading subframes of the basic subframe groups) corresponding to two adjacent basic subframe groups.

In addition, setting section 101 generates "transmission method setting information" for setting a method in which setting target terminal 200 transmits the second type reference signal. The transmission method setting information includes information indicating which one of single shot and multi-shot is set in setting target terminal 200, and the number of subframes for transmitting the second type reference signal with respect to a single piece of trigger information in a case of the multi-shot.

In addition, setting section 101 generates trigger information for instructing terminal 200, which is an instruction target, to start transmission of the second type reference signal.

The candidate resource setting information and the transmission method setting information generated by setting section 101 as described above are transmitted to setting target terminal 200 via coding/modulation section 102, transmission processing section 104, and transmission RF section 105, as setting information. Similarly, the trigger information is also transmitted to setting target terminal 200 via coding/modulation section 102, transmission processing section 104, and transmission RF section 105.

In addition, setting section 101 generates allocation control information which includes resource (RB) allocation information and MCS information regarding one or a plurality of transport blocks (TB). The allocation control information is constituted by allocation control information regarding an uplink resource (for example, PUSCH (Physical Uplink Shared Channel)) for allocating uplink line data, and allocation control information regarding a downlink resource (for example, PDSCH (Physical Downlink Shared Channel)) for allocating downlink line data. In addition, the allocation control information regarding the uplink resource is output to coding/modulation section 102 and reception processing section 108, and the allocation control information regarding the downlink resource is output to coding/modulation section 102 and transmission processing section 104.

Here, a notification of the setting information is sent from base station 100 to terminal 200 as high-order layer information (that is, through RRC signaling). On the other hand, a notification of the allocation control information and the trigger information is sent from base station 100 to terminal 200 using PDCCH (Physical Downlink Control Channel). In other words, whereas the setting information has a relatively long notification interval (that is, the notification is performed at a relatively long interval), the allocation control information and the trigger information have a short notification interval (that is, the notification is performed at a short interval).

Coding/modulation section 102 codes and modulates the setting information, the trigger information, and the allocation control information received from setting section 101, and outputs the obtained modulation signal to transmission processing section 104.

Coding/modulation section 103 codes and modulates an input data signal, and outputs the obtained modulation signal to transmission processing section 104.

Transmission processing section 104 maps the modulation signals received from coding/modulation section 102 and coding/modulation section 103 to a resource indicated by the downlink resource allocation information received from setting section 101, thereby forming a transmission signal. Here, in a case where the transmission signal is an OFDM signal, the modulation signals are mapped to a resource indicated by the downlink resource allocation information received from setting section 101, are converted into a time waveform through an inverse fast Fourier transform (IFFT) process, and have CP (Cyclic Prefix) added thereto, thereby forming an OFDM signal.

Transmission RF section 105 performs transmission wireless processes (up-conversion, digital-analog (D/A) conversion, and the like) on the transmission signal received from transmission processing section 104, and transmits a resultant signal via antenna 106.

Reception RF section 107 performs reception wireless processes (down-conversion, analog-digital (A/D) conversion, and the like) on a wireless signal received via antenna 106, and outputs the obtained reception signal to reception processing section 108.

Reception processing section 108 specifies a resource to which uplink data signal and ACK/NACK information are mapped based on the uplink resource allocation information received from setting section 101, and extracts a signal component mapped to the specified resource from the reception signal.

In addition, reception processing section 108 specifies a resource to which the second type reference signal is mapped based on the setting information and the trigger information received from setting section 101, and extracts a signal component mapped to the specified resource from the reception signal. Specifically, terminal 200 transmits the second type reference signal from a subframe included in the candidate resource set in terminal 200, the subframe being a subframe four or more subframes after a subframe at which the trigger information is transmitted. Therefore, reception processing section 108 specifies a subframe to which the second type reference signal is mapped according to this rule, the candidate subframe group setting information, and the trigger information. In addition, reception processing section 108 specifies a frequency resource unit to which the second type reference signal is mapped in the specified subframe on the basis of the leading subframe, the leading frequency band, the frequency bandwidth, and the frequency hopping bandwidth, included in the candidate resource setting information, and a fixed frequency hopping pattern. In a case of the single shot, a single frequency resource unit in a single subframe is specified. In a case of the multi-shot, a single frequency resource unit is specified for each of a plurality of subframes.

Here, in a case where the reception signal is a spatially multiplexed signal (that is, transmitted using a plurality of code words (CWs)), reception processing section 108 demultiplexes the reception signal for each CW. In addition, in a case where the reception signal is an OFDM signal, reception processing section 108 converts the reception signal into a time domain signal by performing an IDFT (Inverse Discrete Fourier Transform) process on the extracted signal component.

The uplink data signal and the ACK/NACK information extracted by reception processing section 108 in this way are output to data reception section 109, and the second type reference signal is output to SRS reception section 110.

Data reception section 109 decodes the signal received from reception processing section 108. Thereby, the uplink line data and the ACK/NACK information are obtained.

SRS reception section 110 measures reception quality of each frequency resource unit on the basis of the second type reference signal received from reception processing section 108, and outputs reception quality information. Here, in a case where a plurality of second type reference signals transmitted from other terminals 200 are code-multiplexed using orthogonal sequences or the like, SRS reception section 110 also demultiplexes a plurality of code-multiplexed second type reference signals.

In addition, a notification of the setting information (the candidate resource setting information and the transmission method setting information) is preferably performed using high-order layer information in which a notification interval is long from the viewpoint of signaling in a case where traffic circumstances do not vary in a cell of base station 100 or average reception quality is desired to be measured. In addition, a notification of a portion or all of these various offset amounts is performed as broadcast information, thereby further reducing a notification amount. However, in a case where the setting information is required to be more dynamically changed depending on traffic circumstances or the like, a notification of a portion or all of these offset amounts is preferably performed using PDCCH in which a notification interval is short.

Figure 7:
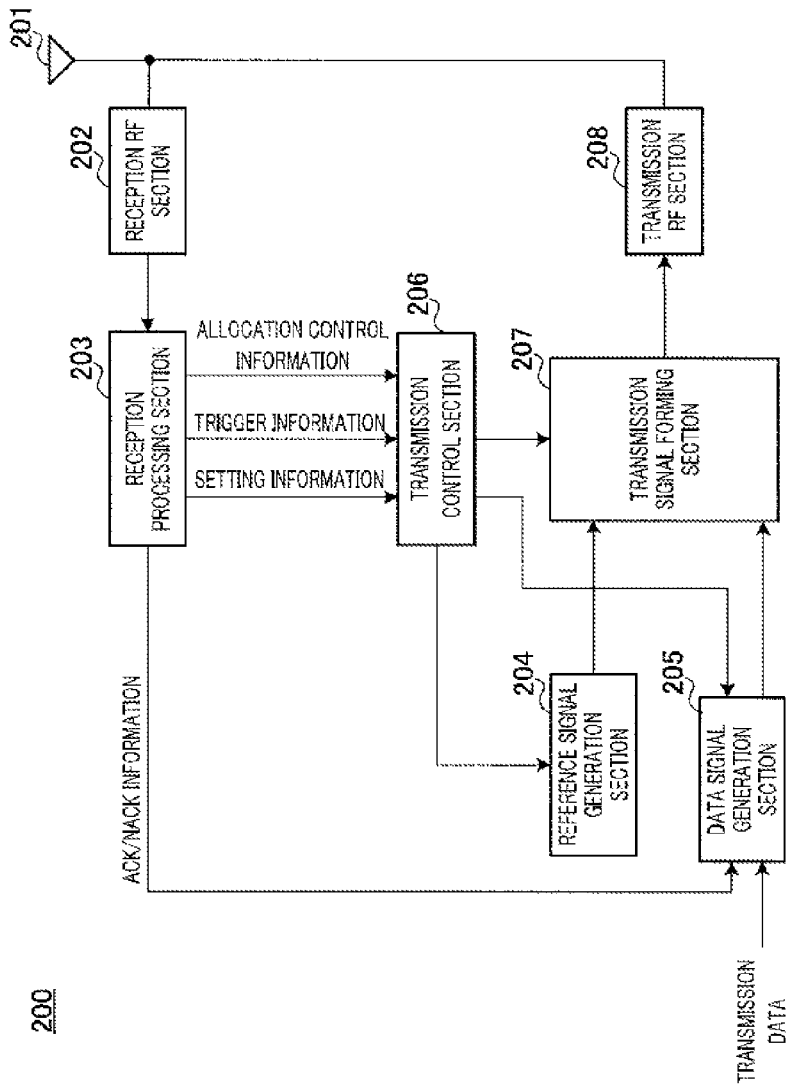
FIG. 7 is a block diagram illustrating a configuration of the terminal according to Embodiment 1 of the present invention.

FIG. 7 is a block diagram illustrating a configuration of terminal 200 according to Embodiment 1 of the present invention. Here, terminal 200 is an LTE-A terminal.

In FIG. 7, terminal 200 includes antenna 201, reception RF section 202, reception processing section 203, reference signal generation section 204, data signal generation section 205, transmission control section 206, transmission signal forming section 207, and transmission RF section 208.

Reception RF section 202 performs reception wireless processes (down-conversion, analog-digital (A/D) conversion, and the like) on a wireless signal received via antenna 201, and outputs the obtained reception signal to reception processing section 203.

Reception processing section 203 extracts the setting information, the allocation control information, the trigger information, and the data signal included in the reception signal. Reception processing section 203 outputs the setting information, the allocation control information, and the trigger information to transmission control section 206. In addition, reception processing section 203 performs an error detection process on the extracted data signal, and outputs ACK/NACK information corresponding to the error detection result to data signal generation section 205.

When a generation instruction signal is received from transmission control section 206, reference signal generation section 204 generates a reference signal which is output to transmission signal forming section 207.

Data signal generation section 205 receives the ACK/NACK information and transmission data, and codes and modulates the ACK/NACK information and the transmission data on the basis of MCS information received from transmission control section 206, thereby generating a data signal. In a case of Non-MIMO transmission, a data signal is generated using a single code word (CW), and, in a case of MIMO transmission, a data signal is generated using two code words. In addition, in a case where the reception signal is an OFDM signal, data signal generation section 205 also performs a CP removal process and an FFT process.

Transmission control section 206 sets a candidate resource to which the terminal itself maps the second type reference signal. Specifically, transmission control section 206 specifies a candidate resource on the basis of the setting information (the candidate resource setting information) received from reception processing section 203. The candidate resource set in terminal 200 will be described later in detail.

In addition, when the trigger information is received from reception processing section 203, transmission control section 206 determines an "RS mapping resource" to which the second type reference signal is practically mapped in the candidate resource, outputs information (hereinafter, also referred to as "RS mapping resource information") regarding the determined RS mapping resource to transmission signal forming section 207, and also outputs a generation instruction signal of a reference signal to reference signal generation section 204. Specifically, the RS mapping resource is a subframe included in the candidate resource set in terminal 200, the subframe being a subframe four or more subframes after a subframe at which the trigger information is transmitted. In addition, in a case of multi-shot, this subframe is set as a leading subframe to set subframes in the candidate resource as the RS mapping resource, the number of the subframes being equal to the number of subframes for transmitting the second type reference signal with respect to a single piece of trigger information.

In addition, transmission control section 206 specifies a "data mapping resource" to which the data signal is mapped on the basis of the allocation control information received from reception processing section 203, outputs information (hereinafter, referred to as "data mapping resource information") regarding the data mapping resource to transmission signal forming section 207, and also outputs the MCS information included in the allocation control information to data signal generation section 205.

Transmission signal forming section 207 maps the second type reference signal received from reference signal generation section 204 to an RS mapping resource indicated by the RS mapping information. In addition, transmission signal forming section 207 maps the data signal received from data signal generation section 205 to a data mapping resource indicated by the data mapping resource information. In this way, a transmission signal is formed. In addition, in a case of Non-MIMO transmission, a data signal of one code word is allocated to one layer, and, in a case of MIMO transmission, a data signal of two code words is allocated to a plurality of layers. Further, in a case where the transmission signal is an OFDM signal, transmission signal forming section 207 performs a DFT (Discrete Fourier Transform) process on the data signal which is then mapped to the data mapping resource. In addition, CP is added to the formed transmission signal.

Transmission RF section 208 performs transmission wireless processes (up-conversion, digital-analog (D/A) conversion, and the like) on the transmission signal formed by transmission signal forming section 207, and transmits a resultant signal via antenna 201.

Operations of Base Station 100 and Terminal 200

Operations of base station 100 and terminal 200 having the above-described configurations will be described. Here, particularly, a setting process of a candidate resource for setting target terminal 200, a transmission process of the second type reference signal using the candidate resource by terminal 200, and a reception process of the second type reference signal transmitted from terminal 200 by base station 100 will be described.

Setting Process of Candidate Resource for Setting Target Terminal 200 by Base Station 100

In base station 100, setting section 101 generates "candidate resource setting information" for setting a "candidate resource" of setting target terminal 200. The candidate resource is a resource to which setting target terminal 200 can map the second type reference signal (for example, the DA- SRS) as described above. In addition, the candidate resource setting information includes a leading subframe and a leading frequency band where setting target terminal 200 starts setting of candidate resource, a frequency bandwidth which can be used by setting target terminal 200, a frequency bandwidth (that is, a frequency hopping bandwidth) used at each timing of frequency hopping, and "candidate subframe group setting information". The "candidate subframe group setting information" includes the number of subframes forming a "basic subframe group", an interval (hereinafter, also referred to as an "interval between constituent subframes") between constituent subframes in the basic subframe group, and an interval (hereinafter, also referred to as an "interval between basic subframe groups") between corresponding subframes (for example, leading subframes of the basic subframe groups) in two adjacent basic subframe groups.

Figure 8:
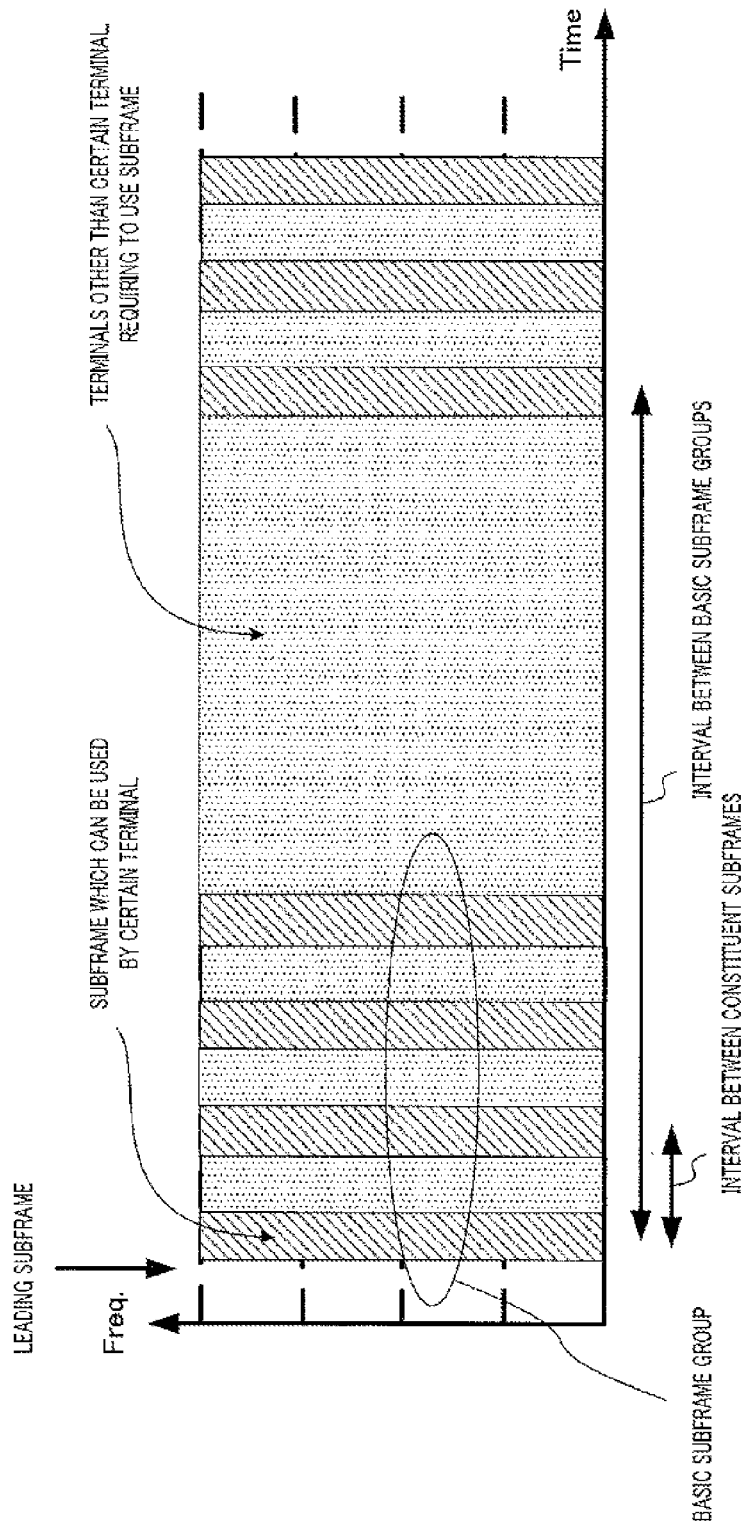
FIG. 8 is a diagram illustrating setting of a candidate resource according to Embodiment 1 of the present invention.

Specifically, in the candidate resource set by setting section 101, as shown in FIG. 8, basic subframe groups each of which is constituted by N constituent subframes are disposed at interval T1 between the basic subframe groups, and the constituent subframes in each basic subframe group are mutually disposed at interval T2 between the constituent subframes. In addition, a leading subframe in the leading basic subframe group is a subframe corresponding to the leading subframe information included in the candidate resource setting information. Naturally, interval T1 between the basic subframe groups is larger than interval T2 between the constituent subframes.

In addition, setting section 101 generates "transmission method setting information" for setting a method in which setting target terminal 200 transmits the second type reference signal. The transmission method setting information includes information indicating which one of single shot and multi-shot is set in setting target terminal 200, and the number of subframes for transmitting the second type reference signal with respect to a single piece of trigger information, in a case of the multi-shot.

In addition, setting section 101 generates trigger information for instructing terminal 200, which is an instruction target, to start transmission of the second type reference signal.

The setting information and the trigger information generated in this way are transmitted to terminal 200.

Transmission Process of Second Type Reference Signal Using Candidate Resource by Terminal 200

In terminal 200, transmission control section 206 sets a candidate resource to which the second type reference signal is mapped by the terminal itself.

Specifically, first, transmission control section 206 specifies a candidate resource on the basis of the setting information (the candidate resource setting information) received from reception processing section 203. Specifically, transmission control section 206 may specify, for example, the candidate subframe group as shown in FIG. 8 on the basis of the candidate subframe group setting information included in the candidate resource setting information.

Second, transmission control section 206 specifies a frequency band indicated by the leading frequency band information in the leading subframe of the leading basic subframe group as a candidate frequency resource unit, and specifies a candidate frequency resource unit in each subframe subsequent to the leading subframe according to a fixed frequency hopping pattern by using the candidate frequency resource unit as a reference. In other words, in the candidate resource, a candidate frequency resource unit is changed depending on the fixed frequency hopping pattern for each constituent subframe of the candidate resource.

Figure 9:
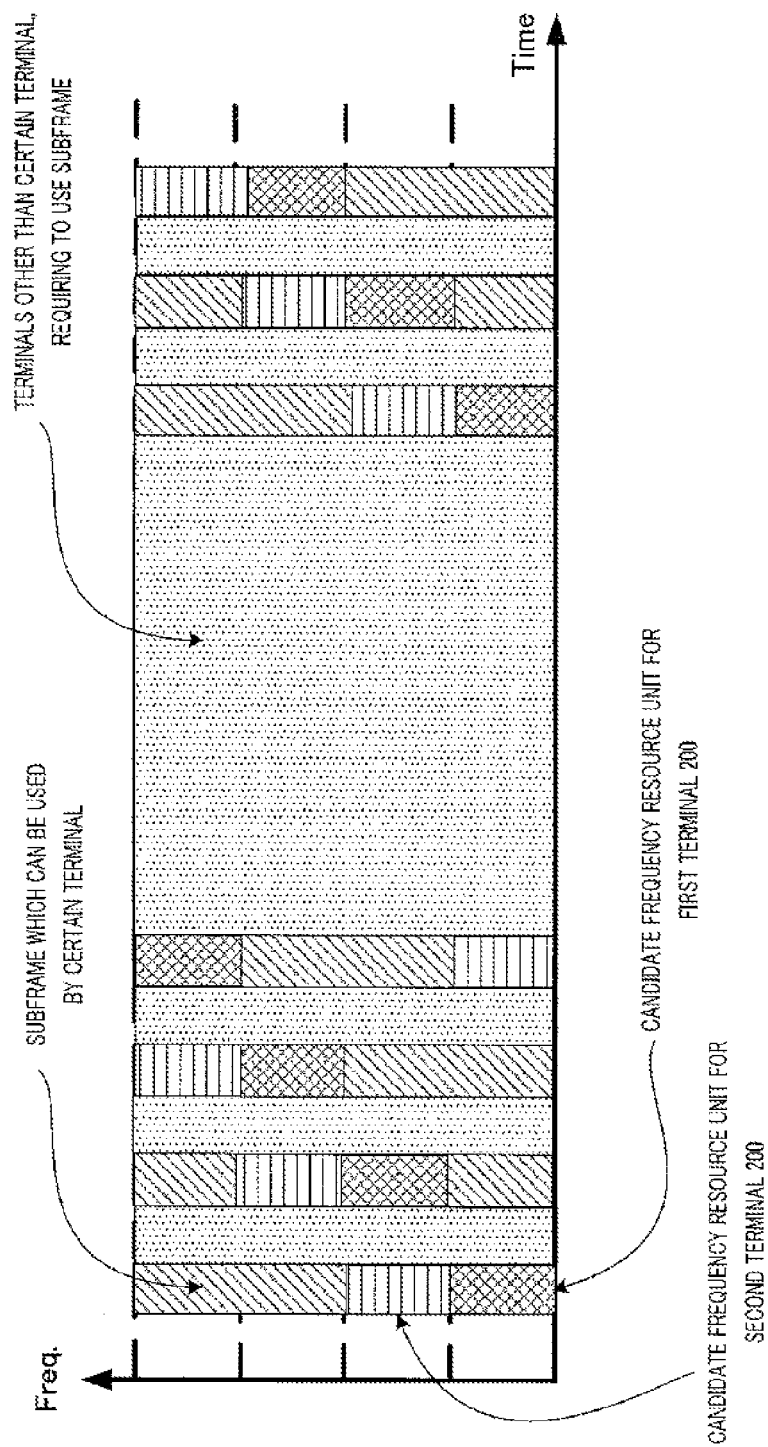
FIG. 9 is a diagram illustrating setting of a candidate resource according to Embodiment 1 of the present invention.

Specifically, as shown in FIG. 9, in a case where a frequency band indicated by the leading frequency band information is a frequency resource unit on the lowest frequency side, a candidate resource set in terminal 200 is a candidate frequency resource unit group for first terminal 200 in the same figure. In addition, as shown in FIG. 9, in a case where a frequency band indicated by the leading frequency band information is a frequency resource unit on the second lowest frequency side, a candidate resource set in terminal 200 is a candidate frequency resource unit group for second terminal 200 in the same figure.

In this way, the candidate resource for terminal 200 is set.

In addition, transmission control section 206 of terminal 200 determines an RS mapping resource to which the second type reference signal is practically mapped in the candidate resource on the basis of the trigger information transmitted from base station 100.

In addition, transmission signal forming section 207 maps the second type reference signal received from reference signal generation section 204 to the RS mapping resource.

Reception Process of Second Type Reference Signal Transmitted from Terminal 200 by Base Station 100

Base station 100 also can specify an RS mapping resource of terminal 200 in the same manner as terminal 200. This is because information which is used to specify an RS mapping resource by terminal 200 is the setting information transmitted from base station 100 and the frequency hopping pattern which is known to base station 100 and terminal 200.

In base station 100, reception processing section 108 specifies an RS mapping resource of terminal 200 and performs a reception process on a signal mapped to the RS mapping resource.

As described above, according to the present embodiment, in terminal 200, transmission control section 206 specifies the candidate resource on the basis of the setting information, and determines a mapping resource to which the second type reference signal is mapped in a candidate frequency unit group forming the candidate resource on the basis of a trigger signal. The candidate resource includes a plurality of basic subframe groups which are disposed at the first interval (the above-described interval between the basic subframes), N (where N is a natural number which is equal to or more than 2) constituent subframes forming each basic subframe group are disposed at the second interval (the above-described interval between the constituent subframes) which is shorter than the first interval, and each candidate frequency unit of a candidate frequency unit group is a frequency unit regulated by a predetermined frequency hopping pattern among M (where M is a natural number which is equal to or more than 2) frequency units of each constituent subframe.

In this way, since the interval between the constituent subframes is set to be short, and thereby many candidate subframes can be set during a short time period, it is possible to repeatedly transmit the second type reference signal during a short time period. Thereby, terminal 200 can transmit the second type reference signal using many frequency units during the short time period. Therefore, base station 100 can perform wide-band frequency scheduling in an early step after transmitting trigger information.

In addition, the interval between the basic subframe groups is set to be long, and thereby many subframes which do not belong to the basic subframe groups can be set between two basic subframe groups. Thereby, it is possible to secure many subframes which can be used by other terminals. For this reason, a chance that other terminals transmit a reference signal increases, and thus frequency scheduling performed by base station 100 is facilitated.

In addition, in a case where an interval between basic subframes is made to conform to an interval between constituent subframes, it is possible to secure subframes which can be used for the second type reference signal at a constant interval.

Embodiment 2

Embodiment 2 relates to a variation in the candidate resource. In the example (refer to FIG. 9) of the candidate resource described in Embodiment 1, the number of constituent subframes of the basic subframe group conforms to the number of elements included in one cycle of the frequency hopping pattern. In contrast, in a candidate resource of Embodiment 2, the number of elements included in one cycle of the frequency hopping pattern is larger than the number of constituent subframes of the basic subframe group.

Here, when base station 100 measures reception quality of terminal 200, the number of frequency resource units for transmitting the second type reference signal (the DA-SRS) to terminal 200 depends on propagation path circumstances between terminal 200 and base station 100. For example, a bandwidth of a frequency resource unit is determined depending on the propagation path circumstances, and, the number of frequency resource units for transmitting the second type reference signal (the DA-SRS) (that is, the number of candidate subframes for transmitting the second type reference signal) is determined from a relationship between a bandwidth of the frequency resource unit and a frequency band for measuring reception quality. On the other hand, the number of transmitted second type reference signals in the multi-shot depends on the number of constituent subframes of the basic subframe group. From these factors, the number of frequency resource units for transmitting the second type reference signal (the DA-SRS) and the number of transmitted second type reference signals in the multi-shot have little relevance to each other. Therefore, it cannot be said that reception quality of all the frequency bands instructed by base station 100 can be measured according to one piece of trigger information.

Figure 10:
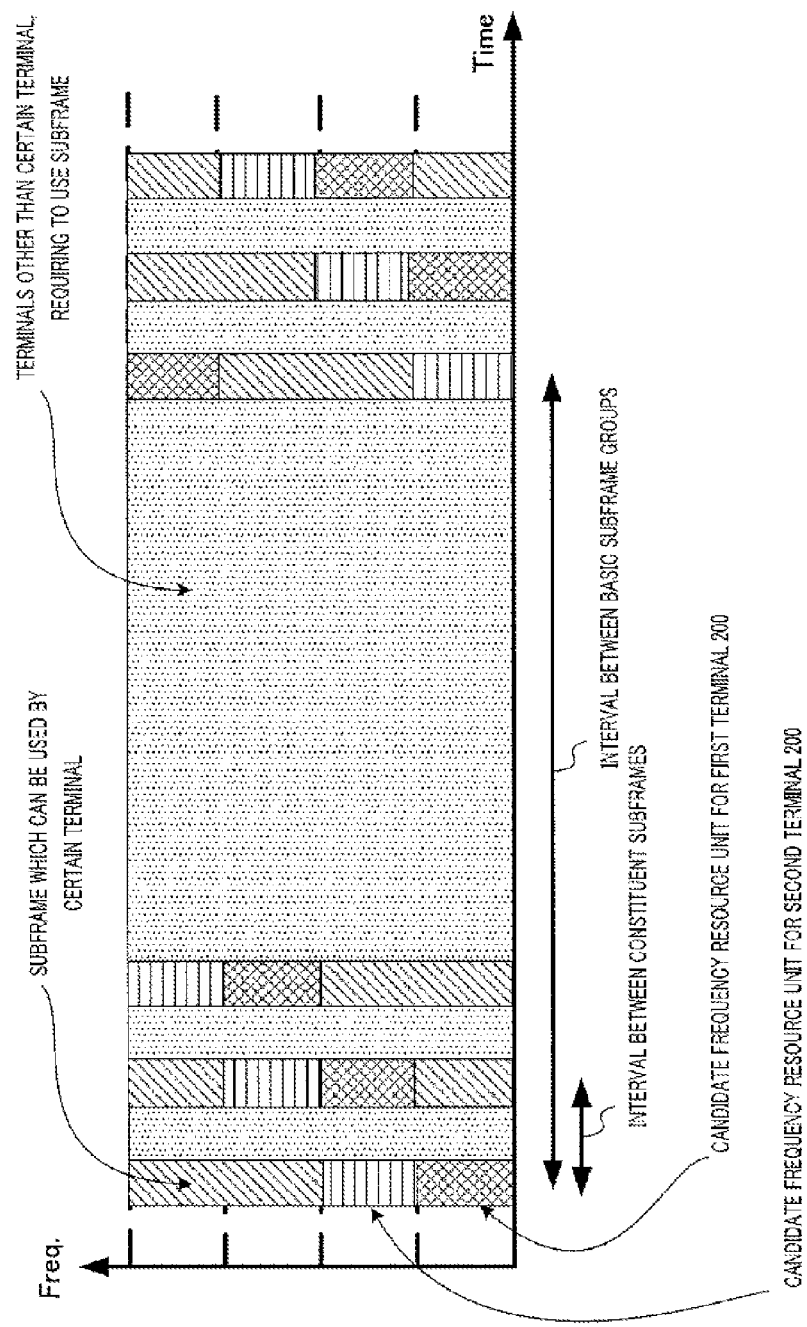
FIG. 10 is a diagram illustrating setting of a candidate resource according to Embodiment 2 of the present invention.

Therefore, a frequency hopping pattern is defined so that one cycle of the frequency hopping pattern covers frequency resource units included in all the bands of which base station 100 notifies terminal 200 as transmission bands of the second type reference signal. FIG. 10 shows an example of the candidate resource in a case where one cycle of the frequency hopping pattern includes four elements, and the number of constituent subframes of a basic subframe group is three. In addition, in FIG. 10, the number of frequency resource units included in all the bands of which base station 100 notifies terminal 200 as transmission bands of the second type reference signal is the same as the number of the elements included in one cycle of the frequency hopping pattern.

According to the present embodiment as described above, the frequency hopping pattern regulates all the frequency units included in frequency bands allocated to terminal 200 in one cycle.

In this way, it is possible to transmit the second type reference signal using all the frequency bands set in terminal 200 by adjusting subframes for transmitting a plurality of pieces of trigger information. Thereby, base station 100 can receive the second type reference signal using all the frequency bands set in terminal 200 and measure reception quality. Therefore, base station 100 can perform frequency scheduling by using reception quality of a wide frequency band, and thus it is possible to improve a performance of frequency scheduling. Particularly, when the number of constituent subframes of a basic subframe group is small, the present invention is useful for a case where reception quality is measured using a wide frequency band and frequency scheduling is intended to be performed with high accuracy.

Embodiment 3

Embodiment 3 relates to a variation in the candidate resource. In Embodiment 3 as well, similarly to Embodiment 1, the number of constituent subframes of the basic subframe group conforms to the number of elements included in one cycle of the frequency hopping pattern. However, in Embodiment 3, a frequency hopping pattern does not cover all frequency resource units included in all the bands of which base station 100 notifies terminal 200 as transmission bands of the second type reference signal as during one cycle. In other words, the number of frequency resource units included in a single subframe is larger than the number of elements included in one cycle of the frequency hopping pattern.

Figure 11:
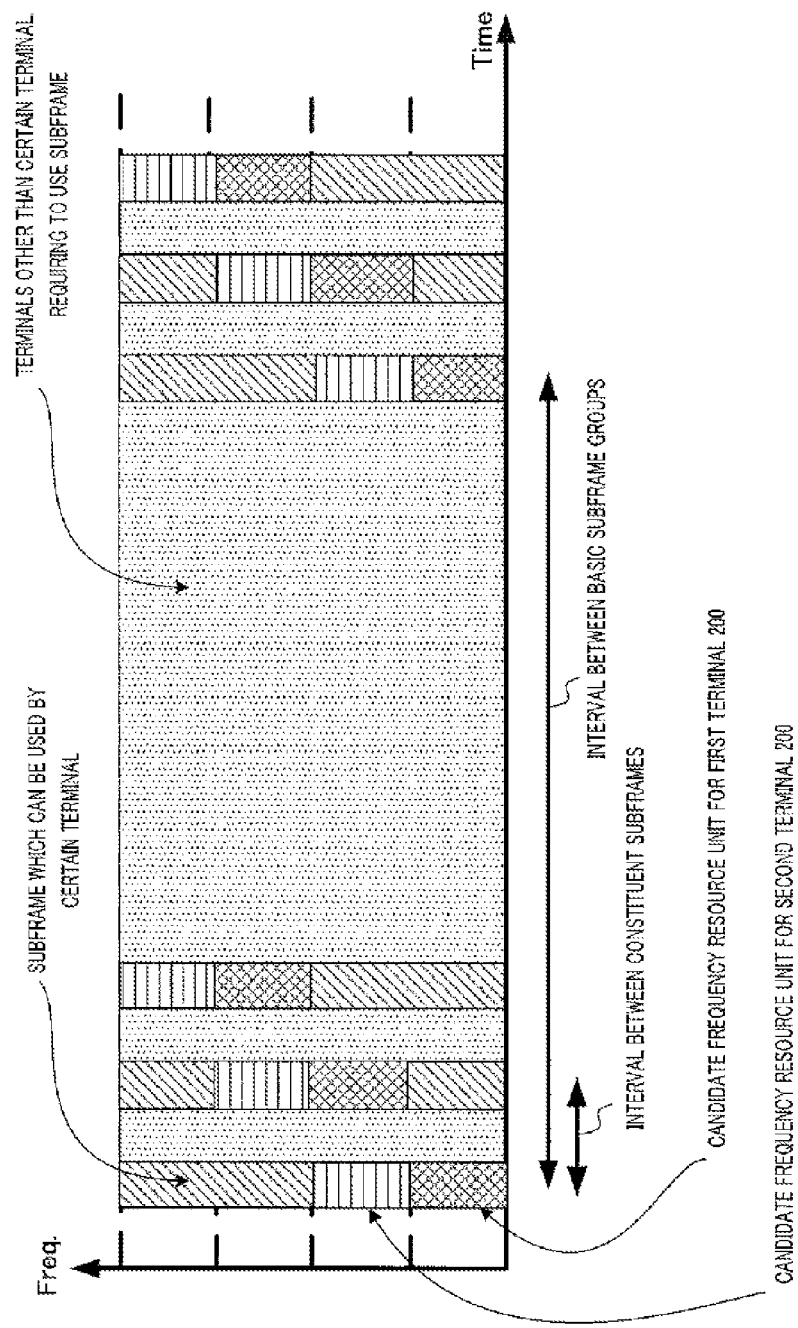
FIG. 11 is a diagram illustrating setting of a candidate resource according to Embodiment 3 of the present invention.

In the example of the candidate resource shown in FIG. 11, the number of constituent subframes of a basic subframe group is three, and the number of elements included in one cycle of the frequency hopping pattern is also three. In addition, the number of frequency resource units in a single subframe is four. Further, candidate frequency resource units in the respective leading subframes of a plurality of basic subframe groups are common to each other. In other words, in FIG. 11, the candidate frequency resource unit in the leading subframe of the first basic subframe group is on the lowest frequency side, and the candidate frequency resource unit in the leading subframe of the second basic subframe group is also on the lowest frequency side in the same manner.

As described above, according to the present embodiment, the number N of constituent subframes is the same as the number of elements in one cycle of the frequency hopping pattern. In addition, candidate frequency resource units in the respective leading subframes of a plurality of basic subframe groups are common to each other. Further, the number of frequency resource units of a single subframe is larger than the number N of constituent subframes.

In this way, in a case where base station 100 measures reception quality of only a specific frequency, reception quality of the second type reference signals transmitted using a plurality of basic subframe groups is averaged, and thereby it is possible to improve accuracy of reception quality. In addition, in a case of using frequency hopping, it is possible to set candidate frequency resource units so as to avoid frequency bands at which, for example, interference between cells frequently occurs. In addition, since the frequency hopping pattern is repeated at an interval between basic subframe groups, to secure a candidate resource is facilitated. In addition, the setting of a candidate resource described in Embodiment 3 is useful for a case where base station 100 needs to measures reception quality of only a frequency band in a specific range and perform frequency scheduling.

Embodiment 4

Embodiment 4 relates to a variation in the candidate resource. In Embodiments 1 and 3, candidate frequency resource units in the respective leading subframes of a plurality of basic subframe groups are common to each other. In contrast, in Embodiment 4, a candidate frequency resource in the leading subframe is shifted between a plurality of adjacent basic subframe groups. In addition, this "shift pattern" is made to conform to a frequency hopping pattern of the first type reference signal.

Figure 12:
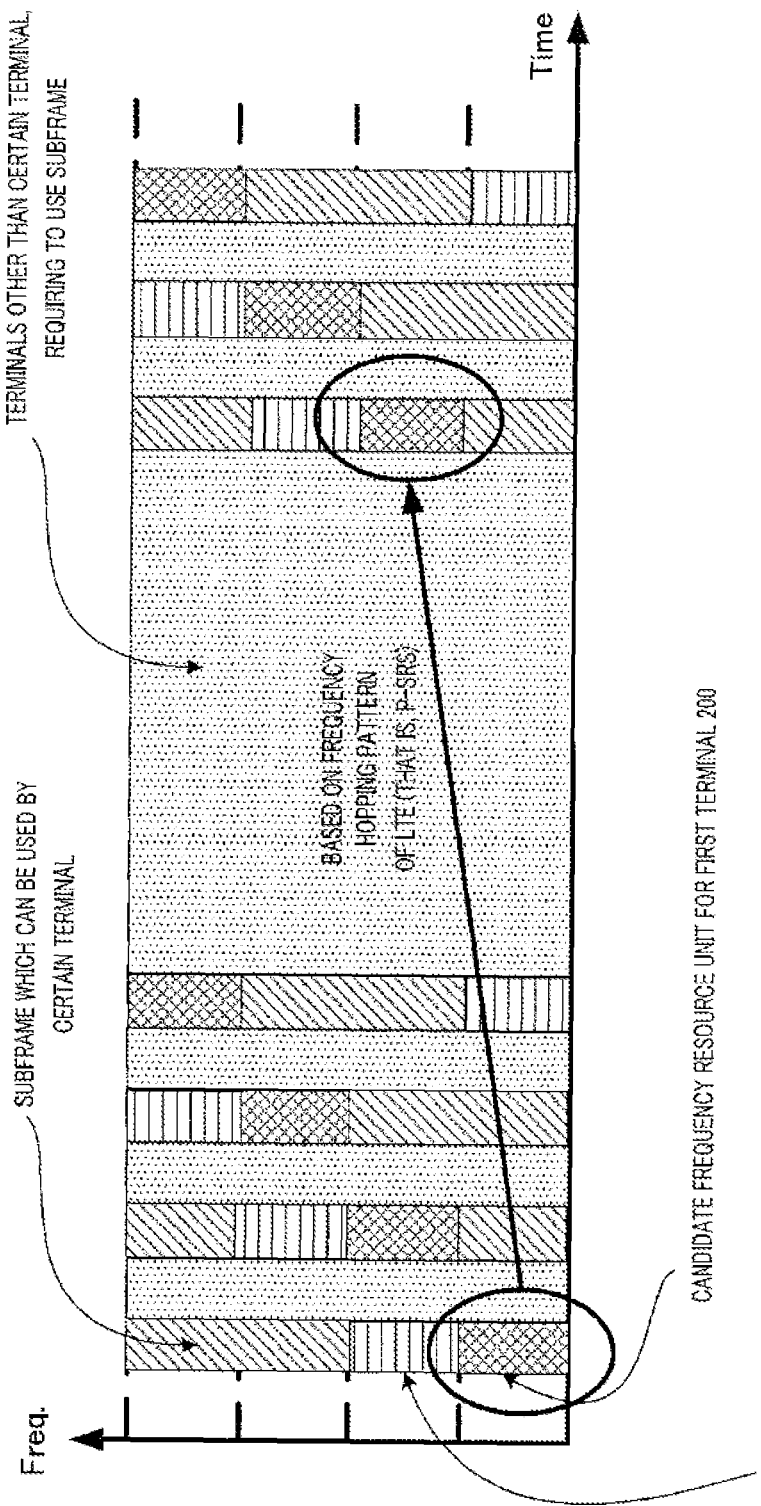
FIG. 12 is a diagram illustrating setting of a candidate resource according to Embodiment 4 of the present invention.

In FIG. 12, a candidate frequency resource unit in the leading subframe of the first basic subframe group is one on the lowest frequency side, and a candidate frequency resource unit in the leading subframe of the second basic subframe group is one on the second lowest frequency side. A pattern regarding a shift amount of the candidate frequency resource unit in the leading subframe between the adjacent basic subframe groups conforms to the frequency hopping pattern of the first type reference signal.

Here, the first type reference signal and the second type reference signal may be code-multiplexed using a cyclic shift sequence which is an orthogonal sequence. In this case, a correspondence relationship between a candidate resource of the first type reference signal and a candidate resource of the second type reference signal can be maintained to be constant by satisfying the following two conditions. In other words, (1) a frequency hopping pattern of the first type reference signal is made to conform to a frequency hopping pattern of the second type reference signal, and a transmission interval of the first type reference signal is made to conform to an interval between basic subframe groups of the second type reference signal. (2) As described above, a pattern regarding a shift amount of the candidate frequency resource unit in the leading subframe between the adjacent basic subframe groups is made to conform to a frequency hopping pattern of the first type reference signal.

Thereby, scheduling for preventing a conflict between the first type reference signal and the second type reference signal is facilitated.

Embodiment 5

Embodiment 5 relates to a variation in the setting method of an RS mapping resource.

Figure 13:
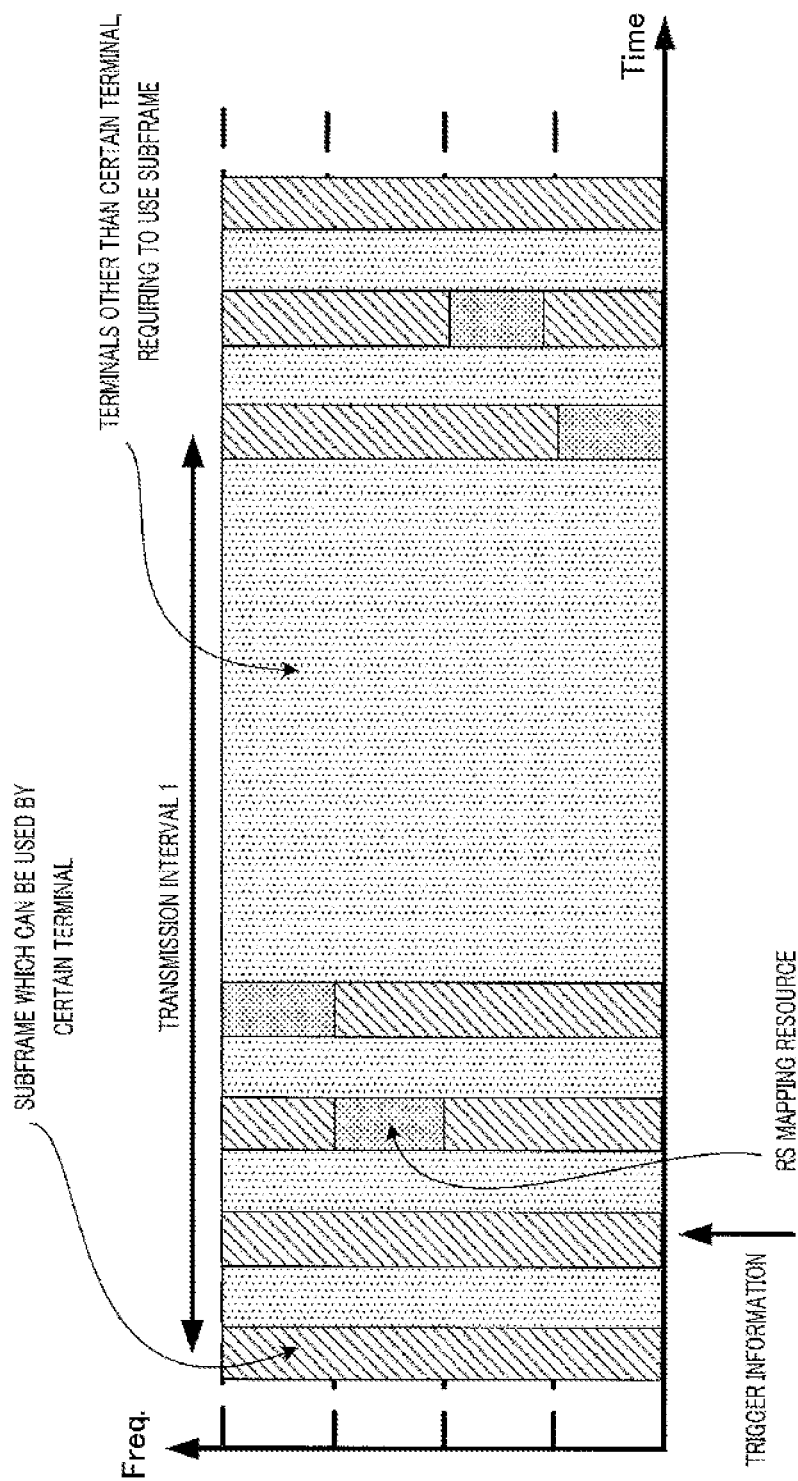
FIG. 13 is a diagram illustrating a setting method of an RS mapping resource according to Embodiment 5 of the present invention.

In a case where second type reference signals transmitted using a single piece of trigger information in the multi-shot cannot all be transmitted in a single basic subframe group, transmission control section 206 of terminal 200 according to Embodiment 5 transmits a plurality of second type reference signals over a plurality of basic subframe groups (refer to FIG. 13).

Here, the "case where second type reference signals cannot all be transmitted in a single basic subframe group" may occur (1) in a case where trigger information is transmitted in a subframe excluding the leading subframe in a basic subframe group, (2) in a case where the number of second type reference signals transmitted using a single piece of trigger information is originally larger than the number of constituent subframes of a basic subframe group, and the like.

As described above, according to the present embodiment, in a case where second type reference signals (that is, corresponding to the number of multiple shots) transmitted using a single piece of trigger information in the multi-shot cannot be all transmitted in a single basic subframe group, a plurality of second type reference signals are transmitted over a plurality of basic subframe groups.

In this way, since second type reference signals corresponding to the number of multiple shots are transmitted at all times, base station 100 can measure reception quality at a frequency band at which the reception quality is desired to be measured.

Embodiment 6

Embodiment 6 relates to a variation in the setting method of an RS mapping resource.

Figure 14:
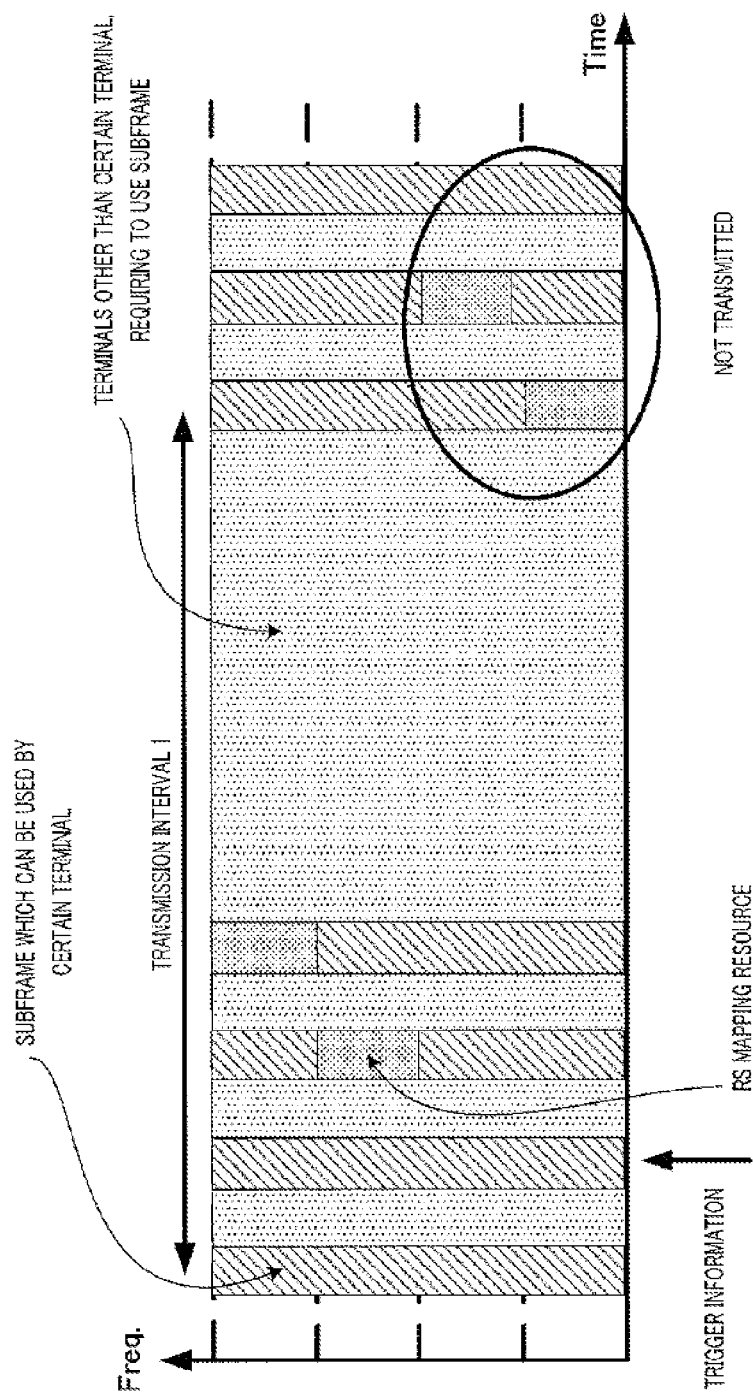
FIG. 14 is a diagram illustrating a setting method of an RS mapping resource according to Embodiment 6 of the present invention.

Even in circumstances in which second type reference signals transmitted using a single piece of trigger information in the multi-shot cannot all be transmitted, transmission control section 206 of terminal 200 according to Embodiment 6 stops transmission of the second type reference signal when a specific time has elapsed from the start of the transmission of the second type reference signal (refer to FIG. 14).

Here, as described above, there is a high probability that, in a case where a data signal is frequently generated, the first type reference signal may be used, and, in a case where a data signal is generated in bursts and a data amount is relatively small, the second type reference signal may be used. In other words, there is a high probability that, in a case where the second type reference signal is used, base station 100 may perform frequency scheduling by using reception quality measured during a short time period, and may not perform the frequency scheduling for the time being thereafter. For this reason, there is a high probability that, in a case where the second type reference signal is used, even if the second type reference signal is transmitted during a long time period, a portion of the second type reference signals may not be used for frequency scheduling and may not contribute to improvements in a performance of frequency scheduling even in a case where reception quality is measured.

Therefore, even in circumstances in which second type reference signals transmitted using a single piece of trigger information in the multi-shot cannot be all transmitted, transmission of the second type reference signal is stopped when a specific time has elapsed from the start of the transmission of the second type reference signal. That is to say, transmission control section 206 of terminal 200 according to Embodiment 6 excludes candidate subframes with a time interval of a predetermined value or more from the leading RS mapping resource from targets of the RS mapping resource. In other words, transmission control section 206 of terminal 200 according to Embodiment 6 uses only candidate subframes with a time interval shorter than the predetermined value from the leading RS mapping resource as targets of the RS mapping resource.

For example, if the above-described predetermined value is set to an interval between basic subframe groups, in a case where second type reference signals transmitted using a single piece of trigger information in the multi-shot cannot all be transmitted in a single basic subframe group, transmission control section 206 of terminal 200 according to Embodiment 6 does not transmit the second type reference signals which cannot be transmitted. In other words, even in a case of the multi-shot, transmission of the second type reference signal using a single piece of trigger information is limited to within a single basic subframe. In addition, it may be understood that trigger information depends on a subframe which is transmitted from base station 100 to terminal 200, and the number of second type reference signals transmitted using a single piece of trigger information may be different.

As described above, according to the present embodiment, in a case where multi-shot transmission in which L (where L is a natural number which is equal to or more than 2) reference signals are transmitted using a single trigger signal is selected, transmission control section 206 of terminal 200 uses only candidate frequency units of subframes with an interval smaller than a predetermined value from an initial mapping resource as targets of the mapping resource.

In this way, since an RS mapping resource is not set in a subframe (a subframe of a specific time or more) with a low probability of being used for frequency scheduling, the resource can be allocated to other terminals, and, as a result, the resource can be effectively used.

Other Embodiments (1) Notifications of a long transmission interval, a short transmission interval, the number of multiple shots, or a transmission time may be performed using a high-order layer (cell specific notification) or PDCCH.

(2) The setting method of a candidate resource of Embodiment 2 and the setting method of a candidate resource of Embodiment 3 may be replaced with each other through signaling.

(3) The frequency hopping pattern treated in Embodiments 1 to 6 is an example, and other patterns may be used. For example, a frequency hopping pattern may be used in which hopping is performed among nonconsecutive frequencies.

(4) Although the claimed invention has been described above with embodiments using antennas, the claimed invention is equally applicable to antenna ports.

The antenna port indicates a logical antenna formed by one or a plurality of physical antennae. In other words, the antenna port is not limited to represent one physical antenna, and may include an array antenna formed by a plurality of antennas, for example For example, in 3GPP LTE, the number of physical antennas for forming the antenna port is not defined, and the antenna port is defined as a minimum unit by which a base station can transmit different reference signals The antenna port may also be defined as a minimum unit for multiplying weighting of a precoding vector.

(5) Although the above each embodiment has been explained using a case where the claimed invention is implemented with hardware, as an example, the claimed invention can be implemented with software.

Furthermore, each function block employed in the explanation of the above each embodiment may typically be implemented as an LSI constituted by an integrated circuit. These function blocks may be individual chips or partially or totally contained on a single chip. The term "LSI" is adopted herein but this may also be referred to as "IC," "system LSI," "super LSI," or "ultra LSI," depending on the differing extents of integration.

The method of implementing integrated circuit is not limited to LSI, and implementation by means of dedicated circuitry or a general-purpose processor may also be possible. After LSI manufacture, utilization of a field programmable gate array (FPGA) or a reconfigurable processor where connections and settings of circuit cells in an LSI can be reconfigured is also possible.

If a new integrated circuit implementation technology replacing LSI is introduced because of advancement in semiconductor technology or a different technology derived therefrom, the function blocks may of course be integrated using that technology. For example, application of biotechnology is possible.

The disclosure of Japanese Patent Application No. 2010-224721, filed on Oct. 4, 2010, including the specification, drawings and abstract, is incorporated herein by reference in its entirety.

INDUSTRIAL APPLICABILITY

The transmitter apparatus, the receiver apparatus, the transmission method, and the reception method of a reference signal of the present invention are useful to enable efficient frequency scheduling while suppressing an amount of candidate resource to which a reference signal is mapped.

REFERENCE SIGNS LIST

100 Base station
101 Setting section
102 And 103 Coding/modulation section
104 Transmission processing section
105 And 208 Transmission RF section
106 And 201 Antenna
107 And 202 Reception RF section
108 And 203 Reception processing section
109 Data reception section
110 SRS reception section
200 Terminal
204 Reference signal generation section
205 Data signal generation section
206 Transmission control section
207 Transmission signal forming section

The invention claimed is:

1. A transmitter apparatus of a reference signal, comprising:
   a reception section that receives setting information regarding a candidate resource to which a reference signal is mapped, in a physical layer;
   a specifying section that specifies the candidate resource on the basis of the setting information;
   a determination section that determines a mapping resource to which a reference signal is mapped on the basis of a trigger signal in a candidate frequency unit group forming the candidate resource; and
   a transmission section that maps a reference signal to the determined mapping resource and transmits the mapped reference signal, wherein
   the candidate resource includes a plurality of basic subframe groups disposed at a first interval, and N (where N is a natural number which is equal to or more than 2) constituent subframes forming each basic subframe group are disposed at a second interval shorter than the first interval, and
   each candidate frequency unit of the candidate frequency unit group is a frequency unit which is regulated by a predetermined frequency hopping pattern among M (where M is a natural number which is equal to or more than 2) frequency units of each constituent subframe.

2. The transmitter apparatus according to claim 1, wherein the predetermined frequency hopping pattern regulates all frequency units included in a frequency band allocated to the transmitter apparatus in one cycle.

3. The transmitter apparatus according to claim 1, wherein the number N of the constituent subframes is the same as the number of elements in one cycle of the predetermined frequency hopping pattern.

4. The transmitter apparatus according to claim 1, wherein the determination section uses only the candidate frequency units of subframes with an interval smaller than a predetermined value from an initial mapping resource as targets of the mapping resource when multi-shot transmission in which L (where L is a natural number which is equal to or more than 2) reference signals are transmitted using a single trigger signal is selected.

5. A receiver apparatus of a reference signal, comprising:
   a setting section that sets a candidate resource to which a reference signal is mapped, for a transmission side of the reference signal;
   a notification section that notifies of setting information regarding the candidate source in a physical layer; and
   a reception section that receives the reference signal in the candidate resource, wherein
   the candidate resource includes a plurality of basic subframe groups disposed at a first interval, and N (where N is a natural number which is equal to or more than 2)

constituent subframes forming each basic subframe group are disposed at a second interval shorter than the first interval, and each candidate frequency unit of a candidate frequency unit group that forms the candidate resource is a frequency unit which is regulated by a predetermined frequency hopping pattern among M (where M is a natural number which is equal to or more than 2) frequency units of each constituent subframe.

6. The receiver apparatus according to claim 5, wherein setting information regarding the candidate resource includes a leading subframe and a leading frequency band in which setting of the candidate resource starts, a frequency bandwidth which can be used by the transmission side, a frequency bandwidth used at each timing of frequency hopping, the number N of the constituent subframes, the first interval, and the second interval.

7. The receiver apparatus according to claim 5, wherein the number N of the constituent subframes is the same as the number of elements in one cycle of the predetermined frequency hopping pattern.

8. The receiver apparatus according to claim 5, wherein the reception section uses only the candidate frequency units of subframes with an interval smaller than a predetermined value from a subframe in which a trigger signal is transmitted as reception targets when multi-shot transmission in which L (where L is a natural number which is equal to or more than 2) reference signals are transmitted using the single trigger signal is selected.

9. A transmission method of a reference signal, comprising:

receiving setting information regarding a candidate resource to which a reference signal is mapped, in a physical layer;

specifying the candidate resource on the basis of the setting information;

determining a mapping resource to which a reference signal is mapped on the basis of a trigger signal in a candidate frequency unit group forming the candidate resource; and mapping a reference signal to the determined mapping resource and transmitting the mapped reference signal, wherein the candidate resource includes a plurality of basic subframe groups disposed at a first interval, and N (where N is a natural number which is equal to or more than 2) constituent subframes forming each basic subframe group are disposed at a second interval shorter than the first interval, and each candidate frequency unit of the candidate frequency unit group is a frequency unit which is regulated by a predetermined frequency hopping pattern among M (where M is a natural number which is equal to or more than 2) frequency units of each constituent subframe.

10. A reception method of a reference signal, comprising:

setting a candidate resource to which a reference signal is mapped, for a transmission side of the reference signal;

notifying of setting information regarding the candidate resource in a physical layer; and receiving the reference signal in the candidate resource, wherein the candidate resource includes a plurality of basic subframe groups disposed at a first interval, and N (where N is a natural number which is equal to or more than 2) constituent subframes forming each basic subframe group are disposed at a second interval shorter than the first interval, and each candidate frequency unit of a candidate frequency unit group that forms the candidate resource is a frequency unit which is regulated by a predetermined frequency hopping pattern among M (where M is a natural number which is equal to or more than 2) frequency units of each constituent subframe.

* * * * *